(12) United States Patent
Hofmann et al.

(10) Patent No.: US 9,957,352 B2
(45) Date of Patent: May 1, 2018

(54) USE OF URETHANE ALCOHOLS FOR PREPARING POLYETHER CARBONATE POLYOLS

(71) Applicant: Covestro Deutschland AG, Leverkusen (DE)

(72) Inventors: Jörg Hofmann, Krefeld (DE); Monika Heinz, Köln (DE); Hartmut Nefzger, Pulheim (DE); Kai Laemmerhold, Weisenheim am Berg (DE); Bert Klesczewski, Köln (DE); Thomas E. Müller, Aachen (DE); Aurel Wolf, Wülfrath (DE); Jens Langanke, Mechernich (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days. days.

(21) Appl. No.: 15/104,480

(22) PCT Filed: Dec. 12, 2014

(86) PCT No.: PCT/EP2014/077509
§ 371 (c)(1),
(2) Date: Jun. 14, 2016

(87) PCT Pub. No.: WO2015/091246
PCT Pub. Date: Jun. 25, 2015

(65) Prior Publication Data
US 2016/0319070 A1    Nov. 3, 2016

(30) Foreign Application Priority Data
Dec. 17, 2013   (EP) .................................... 13197881

(51) Int. Cl.
| | | |
|---|---|---|
| *C08G 64/34* | (2006.01) | |
| *C08G 18/50* | (2006.01) | |
| *C08G 64/02* | (2006.01) | |
| *C08G 18/71* | (2006.01) | |
| *C08G 65/26* | (2006.01) | |
| *C08G 71/04* | (2006.01) | |
| *C08G 18/44* | (2006.01) | |
| *C08G 18/08* | (2006.01) | |
| *C08G 18/76* | (2006.01) | |

(52) U.S. Cl.
CPC ............ *C08G 64/34* (2013.01); *C08G 18/14* (2013.01); *C08G 18/44* (2013.01); *C08G 18/5045* (2013.01); *C08G 18/711* (2013.01); *C08G 18/7621* (2013.01); *C08G 64/0208* (2013.01); *C08G 65/2603* (2013.01); *C08G 65/2615* (2013.01); *C08G 65/2663* (2013.01); *C08G 71/04* (2013.01); *Y02P 20/582* (2015.11)

(58) Field of Classification Search
CPC ................. C08G 18/5045; C08G 64/32–64/34
See application file for complete search history.

(56) References Cited

U.S. PATENT DOCUMENTS

| | | |
|---|---|---|
| 3,404,109 A | 10/1968 | Milgrom |
| 3,538,043 A | 11/1970 | Herold |
| 3,654,224 A | 4/1972 | Milgrom |
| 3,829,505 A | 8/1974 | Herold |
| 3,941,849 A | 3/1976 | Herold |
| 4,214,073 A * | 7/1980 | Passagne ............... C08G 64/00 528/369 |
| 4,263,408 A | 4/1981 | Meyborg et al. |
| 4,355,188 A | 10/1982 | Herold et al. |
| 4,500,704 A | 2/1985 | Kruper, Jr. et al. |
| 4,721,818 A | 1/1988 | Harper et al. |
| 4,877,906 A | 10/1989 | Harper |
| 4,987,271 A | 1/1991 | Watabe et al. |
| 5,032,671 A | 7/1991 | Harper |
| 5,099,075 A | 3/1992 | Katz et al. |
| 5,158,922 A | 10/1992 | Hinney et al. |
| 5,391,722 A | 2/1995 | Chandalia et al. |
| 5,470,813 A | 11/1995 | Le-Khac |
| 6,534,620 B1 * | 3/2003 | Hovestadt ............... C08G 18/44 252/182.26 |
| 6,646,100 B2 | 11/2003 | Hofmann et al. |
| 6,767,986 B2 | 7/2004 | Moethrath et al. |
| 6,780,813 B1 | 8/2004 | Hofmann et al. |
| 6,835,687 B2 | 12/2004 | Hofmann et al. |
| 6,881,856 B2 | 4/2005 | Tanaka et al. |
| 7,008,900 B1 | 3/2006 | Hofmann et al. |
| 7,304,172 B2 | 12/2007 | Coates et al. |
| 8,324,419 B2 | 12/2012 | Mijolovic et al. |

(Continued)

FOREIGN PATENT DOCUMENTS

| | | |
|---|---|---|
| DE | 1 595 759 A1 | 3/1970 |
| DE | 3132258 A1 | 6/1982 |

(Continued)

OTHER PUBLICATIONS

International Search Report for PCT/EP2014/077509 dated Feb. 10, 2015.

*Primary Examiner* — Vasudevan S Jagannathan
*Assistant Examiner* — Stephen E Rieth
(74) *Attorney, Agent, or Firm* — K&L Gates LLP

(57) ABSTRACT

The present invention relates to a method for preparing polyether carbonate polyols by the addition of alkylene oxides and carbon dioxide onto H-functional starter compounds. The method is characterized in that at least one urethane alcohol according to formula (II) is used as an H-functional starter compound, wherein R 1 represents a linear or branched C2 to C24-alkylene which can be optionally interrupted by heteroatoms such as O, S or N and can be substituted; R2 represents a linear or branched C2 to C24-alkylene which can be optionally interrupted by heteroatoms such as O, S or N and can be substituted; R3 represents H, linear or branched C1 to C24-alkyl, C3 to C24-cycloalkyl, C4 to C24-aryl, C5 to C24-arylalkyl, C2 to C24-alkenyl, C2 to 24-alkinyl, that can each be optionally interrupted by heteroatoms such as O, S, or N and/or may each be substituted with alkyl, aryl, and/or hydroxyl.

12 Claims, No Drawings

(56) References Cited

U.S. PATENT DOCUMENTS

| | | |
|---|---|---|
| 8,946,466 B2 | 2/2015 | Gürtler et al. |
| 9,096,717 B2 | 8/2015 | Wamprecht et al. |
| 9,309,356 B2 | 4/2016 | Müller et al. |
| 2006/0205912 A1 | 9/2006 | Nefzger et al. |
| 2012/0165549 A1 | 6/2012 | Ok et al. |

FOREIGN PATENT DOCUMENTS

| | | |
|---|---|---|
| EP | 0 007 502 A1 | 2/1980 |
| EP | 0 222 453 A2 | 5/1987 |
| EP | 385619 A2 | 9/1990 |
| EP | 406440 A1 | 1/1991 |
| EP | 0700949 A2 | 3/1996 |
| EP | 0743093 A1 | 11/1996 |
| EP | 0761708 A2 | 3/1997 |
| EP | 1359177 A1 | 11/2003 |
| EP | 1700877 A1 | 9/2006 |
| EP | 2548905 A1 | 1/2013 |
| GB | 1146660 A | 3/1969 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-03/029325 A1 | 4/2003 |
| WO | WO-2008/013731 A1 | 1/2008 |
| WO | WO-2008092767 A1 | 8/2008 |
| WO | WO-2011/144523 A1 | 11/2011 |
| WO | WO-2012004209 A1 | 1/2012 |

\* cited by examiner

USE OF URETHANE ALCOHOLS FOR PREPARING POLYETHER CARBONATE POLYOLS

CROSS-REFERENCE TO RELATED APPLICATIONS

This application is a national stage application (under 35 U.S.C. § 371) of PCT/EP2014/077509, filed Dec. 12, 2014, which claims benefit of European Application No. 13197881.9, filed Dec. 17, 2013, both applications of which are incorporated herein by reference in their entirety.

The present invention relates to a process for preparing polyether carbonate polyols by addition of alkylene oxides and carbon dioxide ($CO_2$) onto H-functional starter compounds, characterized in that at least one urethane alcohol is used as H-functional starter compound. The invention further provides polyether carbonate polyols containing a urethane group, the polyether carbonate polyols obtainable by the process of the invention, the use of the polyether carbonate polyols of the invention for preparation of a polyurethane polymer, and the resulting polyurethane polymers.

BACKGROUND OF THE INVENTION

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds, Die Makromolekulare Chemie 130, 210-220, 1969). This reaction is shown in schematic form in scheme (I), where R is an organic radical such as alkyl, alkylaryl or aryl which may in each case also contain heteroatoms, for example O, S, Si, etc., and where e, f, g and h are each integers, and where the product shown here in scheme (I) for the polyether carbonate polyol should be understood as meaning merely that blocks having the structure shown may in principle be retained in the polyether carbonate polyol obtained but the sequence, number and length of the blocks and the OH functionality of the starter may vary and is not restricted to the polyether carbonate polyol shown in scheme (I). This reaction (see scheme (I)) is highly advantageous from an environmental standpoint since this reaction comprises converting a greenhouse gas such as $CO_2$ into a polymer. A further product formed, actually a by-product, is the cyclic carbonate shown in scheme (I) (for example propylene carbonate when R=$CH_3$, also referred to hereinafter as cPC, or ethylene carbonate when R=H, also referred to hereinafter as cEC),

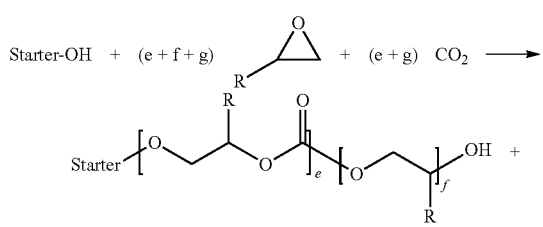

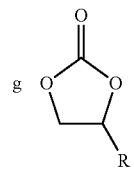

EP-A 0 222 453 discloses a process for preparing polycarbonates from alkylene oxides and carbon dioxide using a catalyst system composed of DMC catalyst and a cocatalyst such as zinc sulfate. WO-A 2003/029325 discloses a process for preparing high molecular weight aliphatic polyether carbonate polyols (weight-average molecular weight greater than 30 000 g/mol), in which a catalyst from the group consisting of zinc carboxylate and multimetal cyanide compound is used. WO-A 2008/092767 discloses a process for preparing polyether carbonate polyols, characterized in that one or more H-functional starter substances are initially charged in the reactor and in that one or more H-functional starter substances are metered continuously into the reactor during the reaction.

U.S. Pat. No. 3,829,505 and DE 1 595 759 describe the possibility of reacting OH-functional starter compounds in excess with aromatic polyisocyanates, in order to arrive in this way at polyurethane polyols containing OH groups and having at least 2 urethane groups, which can be used as starter oligomers for the DMC catalysis.

U.S. Pat. No. 3,654,224 describes the possibility of using amides, especially aromatic amides, for example benzamide, as starter compound for the DMC catalysis.

DETAILED DESCRIPTION OF THE INVENTION

It was therefore an object of the present invention to utilize the cyclic carbonate obtained as a by-product for the preparation of polyether carbonate polyols. Preferably, the polyether carbonate polyols thus obtainable are to be suitable for the preparation of polyurethanes, especially of flexible polyurethane foams.

This object is achieved in accordance with the invention by a process for preparing polyether carbonate polyols by addition of alkylene oxides and carbon dioxide onto H-functional starter compounds, characterized in that at least one urethane alcohol of formula (II)

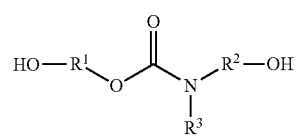

where
$R^1$ is linear or branched $C_2$- to $C_{24}$-alkylene which may optionally be interrupted by heteroatoms such as O, S or N and may be substituted, preferably $CH_2$—$CH_2$ or $CH_2$—$CH(CH_3)$,
$R^2$ is linear or branched $C_2$- to $C_{24}$-alkylene which may optionally be interrupted by heteroatoms such as O, S or N and may be substituted, preferably $CH_2$—$CH_2$ or $CH_2$—$CH(CH_3)$, and
$R^3$ is H, linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms such as O, S or N and/or each of which may be substituted by alkyl, aryl and/or hydroxyl, preferably H, and where R1 to R3 may be identical or different, is used as H-functional starter compound.

The use of the word a in connection with countable parameters should be understood here and hereinafter to mean the number one only when this is evident from the context (for example through the wording "exactly one"). Otherwise, expressions such as "an alkylene oxide", "a urethane alcohol" etc. always refer to those embodiments in which two or more alkylene oxides, two or more urethane alcohols, etc. are used.

The invention is illustrated in detail hereinafter. Various embodiments can be combined here with one another as desired, unless the opposite is apparent to the person skilled in the art from the context.

Preferably, the urethane alcohols of the formula (II) are obtainable by the reaction of cyclic carbonates with amino alcohols. Amino alcohols in the context of the invention are understood to mean compounds having at least one amino group and at least one OH group. Cyclic carbonates used are preferably those which are formed as by-products in the copolymerization of alkylene oxides with $CO_2$, examples being propylene carbonate (cPC) and ethylene carbonate (cEC).

Amino alcohols used are preferably those having primary or secondary amino groups, preferably primary amino groups, particular preference being given to using ethanolamine or isopropanolamine as the amino alcohol.

Preferably, the urethane alcohols of the formula (II) are obtainable by reacting propylene carbonate and/or ethylene carbonate with amino alcohols of formula (III)

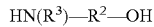

$$HN(R^3)-R^2-OH \quad (III)$$

where $R^2$ and $R^3$ are as defined above.

More preferably, the urethane alcohols of the formula (II) are obtainable by reacting propylene carbonate and/or ethylene carbonate with at least one amine selected from the group consisting of ethanolamine, diethanolamine, (N-methy)ethanolamine, isopropanolamine, diisopropanolamine and propanolamine.

The reaction of the cyclic carbonates with the amino alcohols is effected preferably at 40 to 80° C., more preferably at 55 to 65° C. The reaction time is preferably 5 to 40 h, more preferably 10 to 30 h.

In a particularly advantageous embodiment, the cyclic carbonate is used in excess. Preferably, the molar ratio of cyclic carbonate to amino alcohol is 1.05 to 3, more preferably from 1.1 to 2, most preferably from 1.2 to 1.6. The excess cyclic carbonate can either be removed directly after the synthesis of the urethane alcohol by thin-film evaporation, for example, or can be left in the urethane alcohol and be used in the polyether polyol preparation as well. In the second case mentioned, the excess cyclic carbonate is removed from the product after the polyether polyol preparation.

As well as the urethane alcohols, it is additionally also possible to use H-functional starter compounds lacking urethane groups in the process of the invention, these being described hereinafter. Suitable H-functional starter substances ("starters") employed may be compounds having alkoxylation-active hydrogen atoms and having a molar mass of 18 to 4500 g/mol, preferably of 62 to 500 g/mol and more preferably of 62 to 182 g/mol. The ability to use a starter having a low molar mass is a distinct advantage over the use of oligomeric starters prepared by means of a prior alkoxylation. In particular, a level of economic viability is achieved that is made possible by the omission of a separate alkoxylation process.

Groups active in respect of the alkoxylation and having active hydrogen atoms are, for example, —OH, —NH$_2$ (primary amines), —NH— (secondary amines), —SH, and —CO$_2$H, preferably —OH and —NH$_2$, more preferably —OH. H-Functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of castor oil, monoglycerides of fatty acids, chemically modified mono-, di- and/or triglycerides of fatty acids, and $C_1$-$C_{24}$ alkyl fatty acid esters containing an average of at least 2 OH groups per molecule. By way of example, the $C_1$-$C_{24}$-alkyl fatty acid esters containing an average of at least 2 OH groups per molecule are commercial products such as Lupranol Balance® (from BASF AG), Merginol® products (from Hobum Oleochemicais GmbH), Sovermol® products (from Cognis Deutschland GmbH & Co. KG) and Soyol®TM products (from USSC Co.). Monofunctional starter substances used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (for example 3-methyl-1,5-pentanediol), 1,6-hexanediol, 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the substance class of the polyether polyols having a molecular weight $M_n$ in the range from 18 to 4500 g/mol and a functionality of 2 to 3. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. More particularly, polyether polyols obtainable by the process according to the invention described here are used. For this purpose, these polyether polyols used as H-functional starter substances are prepared in a separate reaction step beforehand.

The H-functional starter substances may also be selected from the substance class of the polyester polyols. The polyester polyols used are at least difunctional polyesters. Preferably, polyester polyols consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1, 2-diol, propane-1,3-diol, butane-1,4-diol, pentane-1,5-diol, neopentyl glycol, hexane-1,6-diol, 1,4-bis(hydroxymethyl) cyclohexane, diethylene glycol, dipropylene glycol, trimethylolpropane, glycerol, pentaerythritol or mixtures of the alcohols mentioned. Employing dihydric or polyhydric polyether polyols as the alcohol component affords polyester ether polyols which can likewise serve as starter substances for preparation of the polyether carbonate polyols.

In addition, H-functional starter substances used may be polycarbonate diols which are prepared, for example, by reaction of phosgene, dimethyl carbonate, diethyl carbonate or diphenyl carbonate and difunctional alcohols or polyester polyols or polyether polyols. Examples of polycarbonates may be found, for example, in EP-A 1359177.

In a further embodiment of the invention, it is possible to use polyether carbonate polyols as H-functional starter substances.

The H-functional starter substances generally have a functionality (i.e. the number of hydrogen atoms active in respect of the polymerization per molecule) of 1 to 8, preferably of 2 or 3. The H-functional starter substances are used either individually or as a mixture of at least two H-functional starter substances.

More preferably, the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol and polyether polyols having a molecular weight Mn in the range from 150 to 4500 g/mol and a functionality of 2 to 3.

The invention further provides polyether carbonate polyols containing a structural unit of the formula (IV)

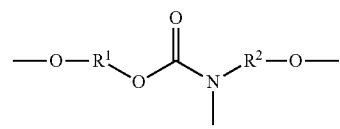

where $R^1$ and $R^2$ are as defined above. Preferably, the polyether carbonate polyols of the invention contain exactly one single structural unit of the formula (IV) per polyether carbonate polyol molecule.

The polyether carbonate polyols of the invention preferably contain a structural unit of the formula (IV) where $R^1$ is $CH_2$—$CH_2$ or $CH_2$—$CH(CH_3)$ and $R^2$ is $CH_2$—$CH_2$ or $CH_2$—$CH(CH_3)$ and where $R^1$ and $R^2$ may be identical or different from one another; more preferably, $R^1$ is $CH_2$—$CH(CH_3)$ and $R^2$ is $CH_2$—$CH(CH_3)$.

Preferably, the polyether carbonate polyols of the invention contain exactly one single structural unit of the formula (IV) per polyether carbonate polyol molecule.

The polyether carbonate polyols of the invention preferably have an OH number of 3 to 400 mg KOH/g, more preferably 10 to 200 mg KOH/g.

In addition, the polyether carbonate polyols of the invention have a functionality of 2.0 to 3.0, preferably of 2.5 to 2.95.

The present invention further provides a process for preparing polyether carbonate polyols by adding alkylene oxides and carbon dioxide onto H-functional starter compounds, characterized in that at least one urethane alcohol of formula (II) is used as H-functional starter compound and the addition is effected in the presence of at least one double metal cyanide catalyst (also referred to as DMC catalyst).

DMC catalysts suitable for the process of the invention are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts which are described, for example, in U.S. Pat. No. 5,470,813, EPA-0 700 949, EP-A-0 743 093, EP-A-0 761 708, WO 97/40086, WO 98/16310 and WO 00/47649 have a very high activity in the polymerization of alkylene oxides and, in some cases, the copolymerization of alkylene oxides with suitable comonomers, for example lactones, cyclic carboxylic anhydrides, lactides, cyclic carbonates or carbon dioxide, and enable the preparation of polymeric polyols at very low catalyst concentrations (25 ppm or less), such that there is generally no longer any need to separate the catalyst from the finished product. A typical example is that of the highly active DMC catalysts which are described in EP-A-0 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

It is also possible to use the alkaline DMC catalysts disclosed in WO 2011/144523.

Cyanide-free metal salts suitable for preparation of the double metal cyanide compounds preferably have the general formula (V)

$$M(X)_n \qquad (V)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$;

M is preferably $Zn^{2+}$, $Fe^{2+}$, $Co^{2+}$ or $Ni^{2+}$.

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, cyanate, thiocyanate, isocyanate, isothiocyanate or nitrate;

or suitable cyanide-free metal salts have the general formula (VI)

$$M_r(X)_3 \quad (VI)$$

where

M is selected from the metal cations $Fe^{3+}$, $Al^{3+}$ and $Cr^{3+}$,

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalates and r is 1 when X=halide, hydroxide, cyanate, thiocyanate, isocyanate, isothiocyanate, carboxylate or nitrate, or suitable cyanide-free metal salts have the general formula (VII)

$$M(X)_s \quad (VII)$$

where

M is selected from the metal cations $Mo^{4+}$, $V^{4+}$ and $W^{4+}$,

X is or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, cyanate, thiocyanate, isocyanate, isothiocyanate, carboxylate or nitrate, or suitable cyanide-free metal salts have the general formula (VIII)

$$M(X)_t \quad (VIII)$$

where

M is selected from the metal cations $Mo^{6+}$ and $W^{6+}$,

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, cyanate, thiocyanate, isocyanate, isothiocyanate, carboxylate or nitrate.

Examples of suitable cyanide-free metal salts are zinc chloride, zinc bromide, zinc iodide, zinc, acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (IX)

$$(Y)_a M'(CN)_b (A)_c \quad (IX)$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e., $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$), A is selected from one or more anions of the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, the values for a, b and c being selected such as to ensure the electronic neutrality of the metal cyanide salt; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (X)

$$M_x[M'_{x'}(CN)_y]_z \quad (X)$$

in which M is defined as in formula (V) to (VIII) and

M' is as defined in formula (IX), and x, x', y and z are integers and are chosen so as to ensure electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A-0 700 949, EP-A-0 761 708, JP-A-4145123, U.S. Pat. No. 5,470,813, EP-A-0 743 093 and WO-A-97/40086. The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitrites, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which contain both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

Optionally used in the preparation of the DMC catalysts are one or more complex-forming component(s) from the compound classes of the polyethers, polyesters, polycarbonates, polyalkylene glycol sorbitan esters, polyalkylene glycol glycidyl ethers, polyacrylamide, poly(acrylamide-coacrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, $\alpha,\beta$-unsaturated carboxylic esters or ionic surface- or interface-active compounds.

Preferably, in the preparation of the DMC catalysts, in the first step, the aqueous solutions of the metal salt (e.g. zinc chloride), used in a stoichiometric excess (at least 50 mol %) based on metal cyanide salt (i.e. at least a molar ratio of cyanide-free metal salt to metal cyanide salt of 125:1.00), and the metal cyanide salt (e.g. potassium hexacyanocobaltate) are converted in the presence of the organic complex ligand (e.g. tert-butanol), such that a suspension is formed comprising the double metal cyanide compound (e.g. zinc hexacyanocobaltate), water, excess cyanide-free metal salt, and the organic complex ligands. This organic complex ligand may be present in the aqueous solution of the cyanide-free metal salt and/or of the metal cyanide salt, or it is added directly to the suspension obtained after precipitation of the double metal cyanide compound. It has been found to be advantageous to mix the aqueous solutions of the cyanide-free metal salt and of the metal cyanide salt and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) comprises using a mixing nozzle, particularly preferably using a jet disperser, as described in WO-A-01/39883.

In the second step, the solid (i.e. the precursor of the inventive catalyst) is isolated from the suspension by known techniques, such as centrifugation or filtration.

In a preferred execution variant for preparing the catalyst, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the catalyst. Preferably, the amount of the organic complex ligand in the aqueous wash solution is between 40% and 80% by weight, based on the overall solution. Further complex-forming component is optionally added to the aqueous wash solution in the third step, preferably in the range between 0.5% and 5% by weight, based on the overall solution.

It is moreover advantageous to wash the isolated solid more than once. For this purpose, for example, the first washing procedure can be repeated. It is preferable, however, to use non-aqueous solutions for further washing operations, e.g. a mixture of organic complex ligands and other complex-forming components.

The isolated and optionally washed solid is subsequently, optionally after pulverization, dried at temperatures of generally 20-100° C. and at pressures of generally 0.1 mbar to standard pressure (1013 mbar).

A preferred process for isolating the DMC catalysts from the suspension by filtration, filtercake washing and drying is described in WO-A-01/80994.

The concentration of DMC catalyst used is 5.0 ppm to 1000 ppm, preferably 10 ppm to 900 ppm and more preferably 20 ppm to 80 ppm, based on the mass of the polyether carbonate polyol to be prepared. According to the profile of requirements for the downstream use, the DMC catalyst can be left in the product or (partly) removed. The (partial) removal of the DMC catalyst can be effected, for example, by treatment with adsorbents. Methods of removing DMC catalysts are described, for example, in U.S. Pat. No. 4,987,271, DE-A-3132258, EP-A-0 406 440, U.S. Pat. No. 5,391,722, U.S. Pat. No. 5,099,075, U.S. Pat. No. 4,721,818, U.S. Pat. No. 4,877,906 and EP-A-0 385 619.

Alkylene oxides suitable for the process of the invention have 2 to 24 carbon atoms. The alkylene oxides having 2 to 24 carbon atoms are preferably one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyalkylene oxidized fats as mono-, di- and triglycerides, alkylene oxidized fatty acids, $C_1$-$C_{24}$ esters of alkylene oxidized fatty acids, epichlorohydrin, glycidol, and derivatives of glycidol, for example methyl glycidyl ether, ethyl glycidyl ether, 2-ethylhexyl glycidyl ether, allyl glycidyl ether, and alkylene oxide-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane and 3-glycidyloxypropyltriisopropoxysilane. The alkylene oxide used is preferably at least one alkylene oxide selected from the group consisting of ethylene oxide and propylene oxide. Further monomers copolymerizable with alkylene oxides and carbon dioxide by the process of the invention under DMC catalysis are all oxygen-containing cyclic compounds, especially lactones, lactides, aliphatic and aromatic cyclic carboxylic anhydrides and cyclic carbonates. The use thereof is described in U.S. Pat. No. 3,538,043, U.S. Pat. No. 4,500,704, U.S. Pat. No. 5,032,671, U.S. Pat. No. 6,646,100, EP-A-0 222 453 and WO-A-2008/013731.

A number of variants for performance of the process of the invention for preparing polyether carbonate polyols by adding alkylene oxides and carbon dioxide onto H-functional starter compounds, characterized in that at least one urethane alcohol of formula (II) is used as H-functional starter compound, are described in detail hereinafter. The illustration is merely by way of example and should not be understood such that it restricts the present invention.

For example, the process of the invention is characterized in that ($\alpha$) the urethane alcohol of formula (II) or a suspension medium is initially charged and any water and/or other volatile compounds are removed by elevated temperature and/or reduced pressure ("drying"), with addition of the DMC catalyst to the urethane alcohol of formula (II) or to the suspension medium before or after the drying, (β) activation is accomplished by adding a portion (based on the total amount of alkylene oxides used in the activation and copolymerization) of alkylene oxide to the mixture resulting from step (α), where this portion of alkylene oxide may optionally be added in the presence of $CO_2$ and where the temperature spike ("hotspot") which then occurs due to the exothermic chemical reaction that follows and/or a pressure drop in the reactor is awaited in each case, and where step (β) for activation may also be repeated, (γ) alkylene oxide, carbon dioxide and optionally urethane alcohol of formula (II) are added to the mixture resulting from step (β) ("copolymerization"), where at least one urethane alcohol of formula (II) is added as H-functional starter substance at least in one of steps (α) and (γ).

Any suspension media used do not contain any H-functional groups. Suitable suspension media are all polar aprotic, weakly polar aprotic and nonpolar aprotic solvents, none of which contain any H-functional groups. As suspension medium it is also possible to use a mixture of two or more of these suspension media. The following polar aprotic suspension media are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar aprotic and weakly polar aprotic suspension media includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Step (α): (Drying)

Preferably, in step (α), a suspension medium containing no H-functional groups is initially charged in the reactor, optionally together with DMC catalyst, and no H-functional starter substance is initially charged in the reactor at this time. Alternatively, it is also possible in step (α) to initially charge the reactor with a suspension medium containing no H-functional groups, and additionally a portion of the urethane alcohol of formula (II) and optionally DMC catalyst, or else it is possible in step (α) to initially charge the reactor with a portion of the urethane alcohol of formula (II) and optionally DMC catalyst. In addition, it is also possible in step (α) to initially charge the reactor with the entirety of the urethane alcohol of formula (II) and optionally DMC catalyst.

The DMC catalyst is preferably used in an amount such that the amount of DMC catalyst in the resulting end product is 10 to 10000 ppm, more preferably 20 to 5000 ppm, and most preferably 50 to 500 ppm.

In a preferred embodiment, inert gas (for example argon or nitrogen), an inert gas/carbon dioxide mixture or carbon dioxide is introduced into the resulting mixture of DMC catalyst with suspension medium and/or urethane alcohol of formula (II) at a temperature of 90° C. to 150° C., more preferably of 100° C. to 140° C., and at the same time a reduced pressure (absolute) of 10 mbar to 800 mbar, particularly preferably of 50 mbar to 200 mbar, is applied.

In an alternative preferred embodiment, the resulting mixture of DMC catalyst with suspension medium and/or urethane alcohol of formula (II) is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can, for example, be added in solid form or as a suspension in one or more than one suspension medium or as a suspension in a urethane alcohol of formula (II).

In a further preferred embodiment, in step (α), (α-I) suspension medium and/or a portion or the entirety of urethane alcohol of formula (II) is initially charged and (α-II) the temperature of the suspension medium and/or the urethane alcohol of formula (II) is brought to 50° C. to 200° C. preferably 80° C. to 160° C., more preferably 100° C. to 140° C., and/or the pressure in the reactor is lowered to less than 500 mbar, preferably 5 mbar to 100 mbar, optionally while passing an inert gas stream (for example of argon or nitrogen), an inert, gas/carbon dioxide stream or a carbon dioxide stream through the reactor, wherein the double metal cyanide catalyst is added to the suspension medium and/or to the urethane alcohol of formula (II) in step (α-I) or immediately thereafter in step (α-II), and wherein the suspension medium contains no H-functional groups.

Step (β): (Activation)

Step (β) serves to activate the DMC catalyst. This step may optionally be conducted under an inert gas atmosphere, under an atmosphere of inert gas/carbon dioxide mixture or under a carbon dioxide atmosphere. Activation in the context of this invention refers to a step wherein a portion of alkylene oxide is added to the DMC catalyst suspension at temperatures of 90° C. to 150° C. and the addition of the alkylene oxide is then interrupted, a subsequent exothermic chemical reaction causing an evolution of heat to be observed which can lead to a temperature spike ("hotspot") and the conversion of alkylene oxide and optionally $CO_2$ causing a pressure drop to be observed in the reactor. The process step of activation is the period of time from the addition of the portion of alkylene oxide, optionally in the presence of $CO_2$, to the DMC catalyst until the occurrence of the evolution of heat. Optionally, the portion of alkylene oxide can be added to the DMC catalyst in a plurality of individual steps, optionally in the presence of $CO_2$, and then the addition of the alkylene oxide can be stopped in each case. In this case, the process step of activation comprises the period from the addition of the first portion of alkylene oxide, optionally in the presence of $CO_2$, to the DMC catalyst until the occurrence of the evolution of heat after addition of the last portion of alkylene oxide. In general, the activation step may be preceded by a step for drying the DMC catalyst and optionally the urethane alcohol of formula (II) at elevated temperature and/or reduced pressure, optionally with passage of an inert gas through the reaction mixture.

The metered addition of one or more alkylene oxides (and optionally the carbon dioxide) can in principle be effected in different ways. The commencement of the metered addition can be effected from vacuum or at a previously chosen supply pressure. The supply pressure is preferably established by introduction of an inert gas (for example nitrogen or argon) or of carbon dioxide, where the pressure (in absolute terms) is 5 mbar to 100 bar, preferably 10 mbar to 50 bar and by preference 20 mbar to 50 bar.

In a preferred embodiment, the amount of one or more alkylene oxides used in the activation in step (β) is 0.1% to 25.0% by weight, preferably 1.0% to 20.0% by weight, especially preferably 2.0% to 16.0% by weight (based on the amount of suspension medium and/or urethane alcohol of formula (II) used in step (α)). The alkylene oxide can be added in one step or in two or more portions. Preferably, after addition of a portion of alkylene oxide, the addition of the alkylene oxide is stopped until the occurrence of evolution of heat and only then is the next portion of alkylene oxide added. Preference is also given to a two-stage activation (step β), wherein (β1) in a first activation stage a first portion of alkylene oxide is added under inert gas atmosphere and (β2) in a second activation stage a second portion of alkylene oxide is added under carbon dioxide atmosphere.

Step (γ): (Copolymerization)

For the process of the invention, it has been found that step (γ) is advantageously conducted at 50 to 150° C., preferably at 60 to 145° C., more preferably at 70 to 140° C. and most preferably at 90 to 130° C. Below 50° C., the reaction to form a polyether carbonate polyol proceeds only very slowly. At temperatures above 150° C., the amount of unwanted by-products rises significantly.

The metered addition of one or more alkylene oxides and the carbon dioxide can be effected simultaneously, alternately or sequentially, it being possible to add the entire amount of carbon dioxide all at once or by metered addition over the reaction time. It is possible, during the addition of the alkylene oxide, to increase or lower the $CO_2$ pressure gradually or stepwise or to leave it constant. Preferably, the total pressure is kept constant during the reaction by metered addition of further carbon dioxide. The metered addition of one or more alkylene oxide(s) is effected simultaneously, alternatively or sequentially with respect to the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyether carbonate polyols, the alkylene oxides can be metered in individually or as a mixture. The metered addition of the alkylene oxides can be effected simultaneously, alternately or sequentially, each via separate metering points (addition points), or via one or more metering points, in which case the alkylene oxides can be metered in individually or as a mixture. It is possible via the manner and/or sequence of the metered addition of the alkylene oxides and/or the carbon dioxide to synthesize random, alternating, block or gradient polyether carbonate polyols.

Preferably, an excess of carbon dioxide is used, based on the calculated amount of carbon dioxide incorporated in the polyether carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether carbonate polyols has been found to be in the range from 0.01 to 120 bar, preferably 0.1 to 110 bar, particularly preferably from 1 to 100 bar. It is possible to feed in the carbon dioxide continuously or discontinuously. This depends on how quickly the alkylene oxides and $CO_2$ are consumed and whether the product is supposed to contain any $CO_2$-free polyether blocks or blocks having different $CO_2$ content. The amount of the carbon dioxide (reported as pressure) can likewise vary in the course of addition of the alkylene oxides. According to the reaction conditions chosen, it is possible to introduce the $CO_2$ into the reactor in the gaseous, liquid or subcritical state. $CO_2$ can also be added to the reactor in solid form and then be converted under the selected reaction conditions to the gaseous, dissolved, liquid and/or supercritical state.

In a process with metered addition of urethane alcohol of formula (II) in step (γ), the metered addition of the urethane alcohol of formula (II), one or more alkylene oxide(s) and optionally also the carbon dioxide can be effected simultaneously or sequentially (in portions); for example, it is possible to add the entire amount of carbon dioxide, the amount of urethane alcohol of formula (II) and/or the amount of alkylene oxides metered in step (γ) all at once or continuously. The term "continuously" used here can be defined as a mode of addition of a reactant such that a concentration of the reactant effective for the copolymerization is maintained, meaning that, for example, the metered addition can be effected with a constant metering rate, with a varying metering rate or in portions.

It is possible during the addition of the alkylene oxide and/or the urethane alcohol of formula (II) to increase or to lower the $CO_2$ pressure gradually or stepwise or to leave it the same. Preferably, the total pressure is kept constant during the reaction by metering in further carbon dioxide. The metered addition of one or more alkylene oxide(s) and/or the urethane alcohol of formula (II) is effected simultaneously or sequentially with the metered addition of carbon dioxide. It is possible to meter in the alkylene oxide at constant metering rate or to increase or to lower the metering rate gradually or stepwise or to add the alkylene oxide in portions. Preferably, the alkylene oxide is added to the reaction mixture at constant metering rate. If two or more alkylene oxides are used for synthesis of the polyether carbonate polyols, the alkylene oxides can be metered in individually or as a mixture. The metered addition of the alkylene oxides or the urethane alcohol of formula (II) can be effected simultaneously or sequentially, each via separate metering points (addition points) or via one or more metering points, in which case the alkylene oxides and the urethane alcohol of formula (II) can be metered in individually or as a mixture. It is possible via the manner and/or sequence of the metered addition of the urethane alcohol of formula (II), the alkylene oxides and/or the carbon dioxide to synthesize random, alternating, block or gradient polyether carbonate polyols.

In a preferred embodiment, in step (γ), the metered addition of the urethane alcohol of formula (II) is ended before the addition of the alkylene oxide.

One characteristic feature of a preferred embodiment of the process of the invention is that, in step (γ), the entire amount of the urethane alcohol of formula (II) is added, meaning that, in step (α), a suspension medium is used. This addition can be effected with a constant metering rate, with a varying metering rate or in portions.

Preferably, the polyether carbonate polyols are prepared in a continuous process comprising both a continuous copolymerization and the continuous addition of the urethane alcohol of formula (II). The present invention therefore also provides a process wherein, in step ($\gamma$), one of the several urethane alcohols of formula (II), one or more alkylene oxide(s) and DMC catalysts are metered continuously into the reactor in the presence of carbon dioxide ("copolymerization") and wherein the resulting reaction mixture (comprising the reaction product) is removed continuously from the reactor. Preferably, in this case, in step ($\gamma$), the DMC catalyst which has been suspended in the urethane alcohol of formula (II) is added continuously. The metered addition of the alkylene oxide, the urethane alcohol of formula (II) and the DMC catalyst can be effected via separate or common metering points. In a preferred embodiment, the alkylene oxide and the urethane alcohol of formula (II) are supplied to the reaction mixture continuously via separate metering points. This addition of the urethane alcohol of formula (II) can be effected as a continuous metered addition into the reactor or in portions.

For example, for the continuous process for preparing the polyether carbonate polyols, an activated DMC-catalyst-suspension medium mixture is prepared according to steps ($\alpha$) and ($\beta$), then, according to step ($\gamma$), ($\gamma$1) a portion each of urethane alcohol of formula (II), one or more alkylene oxide(s) and carbon dioxide are metered in to initiate the copolymerization, and ($\gamma$2) during the advancing copolymerization, the remaining amount of each of DMC catalyst, urethane alcohol of formula (II) and alkylene oxide(s) is metered in continuously in the presence of carbon dioxide, with continuous removal of simultaneously resulting reaction mixture from the reactor.

In step ($\gamma$), the DMC catalyst is preferably added suspended in urethane alcohol of formula (II) zugegeben.

Steps ($\alpha$), ($\beta$) and ($\gamma$) can be performed in the same reactor, or each can be performed separately in different reactors. Particularly preferred reactor types are: tubular reactors, stirred tanks, loop reactors.

Steps ($\alpha$), ($\beta$) and ($\gamma$) can be conducted in a stirred tank, in which case the stirred tank, according to the design and mode of operation, is cooled via the reactor shell, internal cooling surfaces and/or cooling surfaces within a pumped circulation system. Both in the semi-batchwise process, in which the product is not removed until after the end of the reaction, and in the continuous process, in which the product is removed continuously, particular attention should be paid to the metering rate of the alkylene oxide. This should be set such that, in spite of the inhibiting action of the carbon dioxide, the alkylene oxides are depleted quickly enough.

In a preferred embodiment, the mixture comprising the activated DMC catalyst that results from steps ($\alpha$) and ($\beta$) is reacted further in the same reactor with one or more alkylene oxide(s), urethane alcohol of formula (II) and carbon dioxide. In a further preferred embodiment, the mixture comprising the activated DMC catalyst that results from steps ($\alpha$) and ($\beta$) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising the activated DMC catalyst that results from steps ($\alpha$) and ($\beta$), a urethane alcohol of formula (II), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. Advantageously, mixing elements for better mixing of the co-reactants are installed, as sold, for example, by Ehrfeld Mikrotechnik BTS GmbH, or mixer-heat exchanger elements which simultaneously improve the mixing and heat removal.

Loop reactors can likewise be used for performance of steps ($\alpha$), ($\beta$) and ($\gamma$). These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture), Preferably, steps ($\alpha$) and ($\beta$) are conducted in a first reactor, and the resulting reaction mixture is then transferred into a second reactor for the copolymerization in step ($\gamma$). However, it is also possible to conduct steps ($\alpha$), ($\beta$) and ($\gamma$) in one reactor.

The process of the invention can also be conducted in such a way that a DMC catalyst activated according to steps ($\alpha$) and ($\beta$) in a suspension medium is initially used, and, during the copolymerization ($\gamma$), the DMC catalyst is added without prior activation. A particularly advantageous feature of the preferred embodiment of the present invention is thus the ability to use "fresh" DMC catalysts without activation of the portion of DMC catalyst which is added continuously in step ($\gamma$). An activation of DMC catalysts to be conducted analogously to step ($\beta$) does not just involve additional attention from the operator, which results in an increase in the manufacturing costs, but also requires a pressurized reaction vessel, which also results in an increase in the capital costs in the construction of a corresponding production plant. Here, "fresh" DMC catalyst is defined as unactivated DMC catalyst in solid form or in the form of a slurry in a starter substance or suspension medium. The ability of the present process to use fresh unactivated DMC catalyst in step ($\gamma$) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalyst can be fed in a truly continuous manner or in relatively closely spaced increments. Equally, a continuous addition of starter can be effected in a truly continuous manner or in increments. There would be no departure from the present process in adding a DMC catalyst or reactants incrementally such that the concentration of the materials added drops essentially to zero for a period of time before the next incremental addition. However, it is preferable for the DMC catalyst concentration to be kept substantially at the same concentration during the main portion of the course of the continuous reaction, and for starter substance to be present during the main portion of the copolymerization process. An incremental addition of DMC catalyst and/or reactant which essentially does not affect the nature of the product is nevertheless "continuous" in that sense in which the term is being used here. One feasible option is, for example, to provide a recycling loop in which a portion of the reacting mixture is recycled to a prior point in the process, as a result of which discontinuities brought about by incremental additions are smoothed out.

Step (δ)

Optionally, in a step (δ), the resulting reaction mixture in the case of copolymerization, preferably the reaction mixture removed continuously in step (γ), which generally has an alkylene oxide content of from 0.05% by weight to 10% by weight, may be transferred into a postreactor in which, by way of a postreaction, the content of free alkylene oxide is reduced to less than 0.05% by weight in the reaction mixture. The postreactor may be a tubular reactor, a loop reactor or a stirred tank for example. The pressure in this postreactor is preferably at the same pressure as in the reaction apparatus in which the reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 50° C. to 150° C. and more preferably 80° C. to 140° C., In the resulting polyether carbonate polyol, it is subsequently possible to reduce the content of volatile constituents by thermal means, preferably at a temperature of 80° C. to 200° C. For thermal reduction of the volatile constituents, it is possible to use the methods that are common knowledge to those skilled in the art from the prior art. For example, the thermal reduction of the volatile constituents can be achieved by means of thin-film evaporation, short-path evaporation or falling-film evaporation, which is preferably effected under reduced pressure (vacuum). In addition, it is also possible to use conventional distillation methods in which the polyether carbonate polyol is heated, for example, in a flask or stirred tank to a temperature of 80 to 200° C., and the volatile constituents are distilled off overhead. To increase the efficiency of distillation, it is possible to work either under reduced pressure and/or with use of an inert stripping gas (for example nitrogen) and/or with use of an azeotroping agent (e.g. water or inert organic solvent). In addition, the reduction of the volatile constituents can also be affected by vacuum stripping in a packed column, wherein the stripping gas used is typically steam or nitrogen.

In addition to the DMC catalysts based on zinc hexacyanocobaltate ($Zn_3[Co(CN)_6]_2$) that are used with preference, it is also possible to use other metal complex catalysts based on the metals zinc and/or cobalt and known to those skilled in the art from the prior art for copolymerization of epoxides and carbon dioxide for the process of the invention. This includes in particular what are called zinc glutarate catalysts (described, for example, in M. H. Chisholm et al., Macromolecules 2002, 35, 6494), what are called zinc diiminate catalysts (described, for example, in S. D. Allen, J. Am. Chem. Soc. 2002, 124, 14284) and what are called cobalt salen catalysts (described, for example, in U.S. Pat. No. 7,304,172 B2, US 2012/0165549 A1).

The present invention further provides a polyether carbonate polyol obtainable by the process of the invention.

The OH numbers of the polyether carbonate polyols obtained preferably have values of 3 mg KOH/g to 400 mg KOH/g, more preferably of 10 mg KOH/g to 200 mg KOH/g, most preferably of 20 mg KOH/g to 150 mg KOH/g.

The equivalent molar mass is understood to mean the total mass of the material containing active hydrogen atoms divided by the number of active hydrogen atoms. In the case of materials containing hydroxyl groups, it is in the following relationship with the OH number:

equivalent molar mass=56 100/OH number [mg KOH/g]

It is optionally possible to add ageing stabilizers, for example antioxidants, to the polyether carbonate polyols obtainable by the process according to the invention.

The present invention further relates to the use of a polyether carbonate polyol of the invention for preparation of a polyurethane polymer, preferably a flexible polyurethane foam, more preferably a flexible slabstock polyurethane foam or a flexible molded polyurethane foam.

The present invention further provides a polyurethane polymer, preferably a flexible polyurethane foam, more preferably a flexible slabstock polyurethane foam or a flexible molded polyurethane foam, obtainable by reacting a polyisocyanate with a polyether carbonate polyol of the invention by a method familiar to the person skilled in the art, with the aid of standard additives, for example activators, stabilizers, blowing agents, crosslinkers, chain extenders and/or fillers, and optionally further polyether polyols, polyester polyols, polyethercarbonate polyols, polycarbonate polyols and/or filler-containing polyols (polymer polyols, polyurea dispersions, etc.).

Suitable polyisocyanates are aliphatic, cycloaliphatic, araliphatic, aromatic and heterocyclic polyisocyanates, as described, for example, by W. Siefken in Justus Liebigs Annalen der Chemie, 562, pages 75 to 136, for example those of the formula (XI)

in which n=2-4, preferably 2-3, and

Q is an aliphatic hydrocarbyl radical having 2-18 and preferably 6-10 carbon atoms, a cycloaliphatic hydrocarbyl radical having 4-15 and preferably 6-13 carbon atoms or an araliphatic hydrocarbyl radical having 8-15 and preferably 8-13 carbon atoms.

For example, the polyisocyanates are those as described in EP 0 007 502 A1, pages 7-8. Preference is generally given to the readily industrially available polyisocyanates, for example tolylene 2,4- and 2,6-diisocyanate and any desired mixtures of these isomers ("TDI"); polyphenylpolymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), especially those modified polyisocyanates which derive from tolylene 2,4- and/or 2,6-diisocyanate or from diphenylmethane 4,4'- and/or 2,4'-diisocyanate. The polyisocyanates containing urethane groups (prepolymers) may, for example, be reaction products of the polyisocyanates with polyester polyols or else any other polyols (for example conventional polyether polyols). The polyisocyanate used is preferably at least one compound selected from the group consisting of tolylene 2,4- and 2,6-diisocyanate, diphenylmethane 4,4'- and 2,4'- and 2,2'-diisocyanate and polyphenylpolymethylene polyisocyanate ("multiring MDI"); the polyisocyanate used is more preferably a mixture comprising diphenylmethane 4,4'-diisocyanate and diphenylmethane 2,4'-diisocyanate and polyphenylpolymethylene polyisocyanate.

As well as the aforementioned polyisocyanates, it is additionally also possible to use conventional polyether polyols for the preparation of the polyurethane polymers, preferably the flexible polyurethane foams, more preferably the flexible slabstock polyurethane foams or the flexible molded polyurethane foams. Conventional polyether polyols in the context of the invention are understood to mean the alkylene oxide addition products of starter compounds having Zerewitinoff-active hydrogen atoms. Examples of such polyether polyols are known to those skilled in the art. They may have a hydroxyl number to DIN 53240 of ≥3.0 mg KOH/g to ≤1000 mg KOH/g, preferably of ≥5.0 mg KOH/g to ≤600 mg KOH/g. The starter compounds having Zerewitinoff-active hydrogen atoms used for the preparation of the conventional polyether polyols usually have functionalities of 2 to 8. The starter compounds may be hydroxy-functional and/or amino-functional. Examples of hydroxy-functional starter compounds are propylene glycol, ethylene glycol, diethylene dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. Examples of amino-functional starter compounds are ammonia, ethanolamine, diethanolamine, triethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane.

Suitable alkylene oxides for the conventional polyether polyols are, for example, ethylene oxide, propylene oxide, 1,2-butylene oxide or 2,3-butylene oxide and styrene oxide. Preference is given to feeding propylene oxide and ethylene oxide into the reaction mixture individually, in a mixture or successively. If the alkylene oxides are metered in successively, the products produced contain polyether chains having block structures. Products having ethylene oxide end blocks are characterized, for example, by elevated concentrations of primary end groups which impart advantageous isocyanate reactivity to the systems.

The preparation of the conventional polyether polyols may be base-catalyzed, for example via alkali metal hydroxide or amine catalysis, double metal cyanide-catalyzed, or acid-catalyzed by Lewis or Brønsted acids.

As well as the aforementioned conventional polyether polyols, it is additionally or alternatively also possible to use polyester polyols for the preparation of the polyurethane polymers, preferably the flexible polyurethane foams, more preferably the flexible slabstock polyurethane foams or the flexible molded polyurethane foams. Suitable polyester polyols preferably have OH numbers in the range from 6 to 800 mg KOH/g and can be prepared, for example, from polyfunctional carboxylic acids, preferably organic dicarboxylic acids having 2 to 12 carbon atoms, and polyhydric alcohols, preferably diols, having 2 to 12 carbon atoms, preferably 2 to 6 carbon atoms, by known methods. Rather than the polyfunctional carboxylic acids, it is also possible to use derivatives thereof, for example acid chlorides or anhydrides.

EXAMPLES

Test Methods:

Experimentally determined OH numbers were determined by the method of DIN 53240. The amine numbers (NH number) were determined by the method of DIN 53176.

The viscosities were determined by means of a rotary viscometer (Physica MCR 51, manufacturer: Anton Paar) by the method of DIN 53018.

The fraction of incorporated $CO_2$ in the resulting polyether carbonate polyol ($CO_2$ content) and the ratio of propylene carbonate to polyether carbonate polyol were determined by $^1$H NMR (Bruker DPX 400, 400 MHz; pulse program zg30, relaxation delay d1: 10 s, 64 scans). Each sample was dissolved in deuterated chloroform. The relevant resonances in the $^1$H NMR (based on TMS=0 ppm) are as follows:

cyclic carbonate (which was formed as a by-product) resonance at 4.5 ppm, carbonate resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) having resonances at 1.2 to 1.0 ppm.

The mole fraction of the carbonate incorporated in the polymer in the reaction mixture is calculated by formula (XIV) as follows, using the following abbreviations:

A(4.5)=area of the resonance at 4.5 ppm for cyclic carbonate (corresponds to a hydrogen atom)

A(5.1-4.8)=area of the resonance at 5.1-4.8 ppm for polyether carbonate polyol and a hydrogen atom for cyclic carbonate A(2.4)=area of the resonance at 2.4 ppm for free, unreacted PO A(1.2-1.0)=area of the resonance at 1.2-1.0 ppm for polyether polyol Taking into account the relative intensities the values for the polymer-bound carbonate ("linear carbonate" LC) in the reaction mixture were converted into mol % as per the following formula (XII):

$$LC = \frac{A(5.1-4.8) - A(4.5)}{A(5.1-4.8) + A(2.4) + 0.33*A(1.2-1.0)} *100 \quad \text{(XII)}$$

The weight fraction (in % by weight) of polymer-bound carbonate (LC') in the reaction mixture was calculated by formula (XIII), $$LC' = \frac{[A(5.1-4.8) - A(4.5)]*102}{D} *100\% \quad \text{(XIII)}$$

where the value of D ("denominator" D) is calculated by formula (XIV):

$$D=[A(5.1-4.8)-A(4.5)]*102+A(4.5)*102+A(2.4)*58+0.33*A(1.2-1.0)*58 \quad \text{(XIV)}$$

The factor of 102 results from the sum of the molar masses of $CO_2$ (molar mass 44 g/mol) and of propylene oxide (molar mass 58 g/mol); the factor of 58 results from the molar mass of propylene oxide.

The weight fraction (in % by weight) of cyclic carbonate (CC') in the reaction mixture was calculated by formula (XI):

$$CC' = \frac{A(4.5)*102}{D} *100\% \quad \text{(XV)}$$

where the value of D is calculated by formula (XIV).

In order to calculate the composition based on the polymer component (consisting of polyether which has been formed from propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The weight fraction of the repeat carbonate units in the polyether carbonate polyol was converted to a weight fraction of carbon dioxide using the factor A=44/(44+58). The figure for the $CO_2$ content in the polyether carbonate polyol ("$CO_2$ incorporated"; see examples which follow and table 1) is normalized to the polyether carbonate polyol molecule which has formed in the copolymerization and the activation steps.

The amount of cyclic propylene carbonate formed is determined via the mass balance of the total amount of cyclic propylene carbonate present in the reaction mixture and the amount of propylene carbonate used as the initial charge.

The determination of the functionality of the starter in the finished polyether carbonate polyol was conducted by means of $^{13}C$ NMR (from Bruker, Advance 400, 400 MHz; wait time d1: 4 s, 6000 scans). Each sample was dissolved in deuterated acetone-D6 with addition of chromium(III) acetylacetonate. The solution concentration was 500 mg/mL.

The relevant resonances in the $^{13}C$ NMR (based on $CHCl_3$=7.24 ppm) are as follows:

The carbon signals of the carbon atoms bonded directly to the nitrogen (methylene groups, methine group) of the starter are evaluated:

Bifunctionally started: 40.4 ppm to 40.0 ppm (one carbon)

Trifunctionally started: 42.2 ppm to 40.5 ppm (two carbons)

Bifunctionally started means that only the OH groups of the urethane alcohol starter compound are alkoxylated.

Trifunctionally started means that the OH groups and the NH group of the urethane bond of the urethane alcohol starter compound are alkoxylated.

The chemical shifts in the $^{13}C$ NMR were determined by comparative measurements (comparative spectra).

The apparent densities were determined to DIN EN ISO 845.

The compression hardnesses (40% compression) were determined to DIN EN ISO 1798.

Raw Materials Used:

Catalyst for the preparation of the polyether carbonate polyols (DMC catalyst):

Double metal cyanide catalyst, containing zinc hexacyanocobaltate, tert-butanol and polypropylene glycol having a number-average molecular weight of 1000 g/mol, according to example 6 in WO-A 01/80994.

Cyclic propylene carbonate (cPC): from Acros, art. no.: 131560025

Cyclic ethylene carbonate (cEC): from Acros, art. no.: 118410010

Ethanolamine: from Merck; art. no.: 800849

Stabilizer 1: siloxane-based foam stabilizer, Tegostab® BE 2370, Evonik Goldschmidt Isocyanate 1: mixture of 80% by weight of tolylene 2,4- and 20% by weight of tolylene 2,6-diisocyanate, available under the Desmodur® T 80 name, Bayer MaterialScience AG Catalyst 1: bis(2-dimethylaminoethyl) ether in dipropylene glycol, available as Addocat® 108, from Rheinchemie Catalyst 2: tin(II) ethylhexonate, available as Dabco® T-9, from Air Products Preparation of Urethane Alcohols:

Example 1a

A 10 L four-neck flask having a reflux condenser and thermometer was initially charged with cyclic propylene carbonate (6080 g, 59.6 mol). Subsequently, ethanolamine (2405 g, 39.6 mol) was gradually added dropwise at 60° C. within 50 min at such a rate that the temperature did not exceed 72° C. The reaction mixture was subsequently stirred at 60° C. for 24 h. After cooling to 25° C., the urethane alcohol was obtained.

Properties of the resulting urethane alcohol:
OH number: 507 mg KOH/g
NH number: 0.51 mg KOH/g
Viscosity (25° C.): 268 mPas Example 1b 1000 g of urethane alcohol, prepared according to example 1a, was freed of volatile constituents by means of thin-film evaporation (0.1 mbar, 120° C.).

This resulted in a urethane alcohol having the following properties:
OH number: 671 mg KOH/g
NH number: 0.20 mg KOH/g
Viscosity (25° C.): 3170 mPas Example 2

A 2 L four-neck flask with reflux condenser and thermometer was initially charged with a mixture of cyclic propylene carbonate (1181 g, 11.6 mol) and cyclic ethylene carbonate (62 g, 0.7 mol) which had been heated to 50° C. Subsequently, ethanolamine (500 g, 8.2 mol) was gradually added dropwise at 60° C. within 60 mm at such a rate that the temperature did not exceed 70° C. The reaction was subsequently stirred at 60° C. for 15 h. After cooling to 25° C., the urethane alcohol was obtained.

Properties of the resulting urethane alcohol:
OH number: 523 mg KOH/g
NH number: 0.20 mg KOH/g
Viscosity (25° C.): 313 mPas Example 3 (LAEM 528)

A 2 L four-neck flask with reflux condenser and thermometer was initially charged with a mixture of cyclic propylene carbonate (1110 g, 10.9 mol) and cyclic ethylene carbonate (123 g, 1.4 mol) which had been heated to 50° C. Subsequently, ethanolamine (500 g, 8.2 mol) was gradually added dropwise at 60° C. within 60 min at such a rate that the temperature did not exceed 79° C. The reaction was subsequently stirred at 60° C. for 15 h. After cooling to 25° C., the urethane alcohol was obtained.

Properties of the resulting urethane alcohol:
OH number: 527 mg KOH/g
NH number: 0.30 mg KOH/g
Viscosity (25° C.): 295 mPas Preparation of Polyether Carbonate Polyols:

Example 4: Copolymerization of PO and $CO_2$ with Continuous Metered Addition of the Urethane Alcohol Starter Compound Step ($\alpha$) ("Drying"):

107 mg of unactivated dried DMC catalyst were suspended in 31 g of 4-methyl-2-oxo-1,3-dioxolane (also referred to hereinafter as cyclic propylene carbonate or cPC) and the suspension was then introduced into a 1 L pressure reactor with a gas metering device. The suspension was then heated up to 130° C. and was introduced together with 26-30 L/h of nitrogen over the course of 30 min and, at the same time, reduced pressure of 75-100 mbar was applied.

Step ($\beta$) ("Catalyst Activation"):

In the reactor, at 130° C., 1200 rpm and at a supply pressure of about 100 mbar, which was established with nitrogen, an amount of 5 g of propylene oxide (PO) was added all at once. The onset of the reaction was manifested by a temperature spike ("hotspot") and by a pressure drop to the starting pressure. After the first pressure drop, the reactor was pressurized with p=50 bar of $CO_2$ then, for activation, a further 10 g of PO were added all at once. After a delay, there was another temperature spike and the total pressure in the reactor showed a pressure decrease.

Step ($\gamma$) ("Copolymerization of PO and $CO_2$ with Continuous Metered Addition of the Urethane Alcohol Starter Compound"):

On completion of activation, propylene oxide (196 g) at 1.00 g/min and 18 g of the urethane alcohol from example 1b at 0.104 g/min were metered simultaneously into the reactor. At the same time, the reaction temperature was lowered from 130° C. at 1° C./min to 105° C. The progress of the reaction was monitored via the $CO_2$ consumption, by keeping the pressure in the reactor constant at 50 bar of $CO_2$ by continuously regulated replenishment. After the addition of PO had ended, stirring was continued at 105° C. and reaction pressure until the $CO_2$ consumption had abated (1200 rpm). This further reaction took about 3 h.

The product mixture obtained was freed of traces of monomeric propylene oxide by means of a rotary evaporator and stabilized by the addition of 500 ppm of Irganox 1076. Subsequently, the cyclic propylene carbonate was removed from the reaction mixture by means of thin-film evaporation (0.1 mbar, 120° C.). The $CO_2$ content incorporated in the polycarbonate polyol, the viscosity, OH number and functionality were determined by the abovementioned analytical methods.

Properties of the resulting polyether carbonate polyol:
OH number: 58.7 mg KOH/g
Viscosity (25° C.): 4640 mPas
$CO_2$ content: 15.0%
Functionality: 2.74

Example 5: Copolymerization of PO and $CO_2$ with Continuous Metered Addition of the Urethane Alcohol Starter Compound Step ($\alpha$) ("Drying"):

107 mg of unactivated dried DMC catalyst were suspended in 31 g of cPC and the suspension was then introduced into a 1 L pressure reactor with a gas metering device. The suspension was then heated up to 130° C. and was introduced together with 26-30 L/h of nitrogen over the course of 30 min and, at the same time, reduced pressure of 75-100 mbar was applied.

Step ($\beta$) ("Catalyst Activation"):

In the reactor, at 130° C., 1200 rpm and at a supply pressure of about 100 mbar, which was established with nitrogen, an amount of 5 g of propylene oxide (PO) was added all at once. The onset of the reaction was manifested by a temperature spike ("hotspot") and by a pressure drop to the starting pressure. After the first pressure drop, the reactor was pressurized with p=50 bar of $CO_2$ then, for activation, a further 10 g of PO were added all at once. After a delay, there was another temperature spike and the total pressure in the reactor showed a pressure decrease.

Step ($\gamma$) ("Copolymerization of PO and $CO_2$ with Continuous Metered Addition of the Urethane Alcohol Starter Compound"):

On completion of activation, propylene oxide (196 g) at 1.01 g/min and 18 g of the urethane alcohol from example 2 at 0.100 g/min were metered simultaneously into the reactor. At the same time, the reaction temperature was lowered from 130° C. at 1° C./min to 105° C. The progress of the reaction was monitored via the $CO_2$ consumption, by keeping the pressure in the reactor constant at 50 bar of $CO_2$ by continuously regulated replenishment. After the addition of PO had ended, stirring was continued at 105° C. and reaction pressure until the $CO_2$ consumption had abated (1200 rpm). This further reaction took about 3 h.

The product mixture obtained was freed of traces of monomeric propylene oxide by means of a rotary evaporator and stabilized by the addition of 500 ppm of Irganox 1076. Subsequently, the cyclic propylene carbonate was removed from the reaction mixture by means of thin-film evaporation (0.1 mbar, 120° C.). The $CO_2$ content incorporated in the polyether carbonate polyol, the viscosity and OH number were determined by the abovementioned analytical methods.

Properties of the resulting polyether carbonate polyol:
OH number: 50.7 mg KOH/g
Viscosity (25° C.): 7370 mPas
$CO_2$ content: 16.6%

Example 6: Copolymerization of PO and $CO_2$ with Continuous Metered Addition of the Urethane Alcohol Starter Compound Step ($\alpha$) ("Drying"):

107 mg of unactivated dried DMC catalyst were suspended in 31 g of cPC and the suspension was then introduced into a 1 L pressure reactor with a gas metering device. The suspension was then heated up to 130° C. and was introduced together with 26-30 L/h of nitrogen over the course of 30 min and, at the same time, reduced pressure of 75-100 Mbar was applied.

Step ($\beta$) ("Catalyst Activation"):

In the reactor, at 130° C. 1200 rpm and at a supply pressure of about 100 mbar, which was established with nitrogen, an amount of 5 g of propylene oxide (PO) was added all at once. The onset of the reaction was manifested by a temperature spike ("hotspot") and by a pressure drop to the starting pressure. After the first pressure drop, the reactor was pressurized with p=50 bar of $CO_2$ then, for activation, a further 10 g of PO were added all at once. After a delay, there was another temperature spike and the total pressure in the reactor showed a pressure decrease.

Step ($\gamma$) ("Copolymerization of PO and $CO_2$ with Continuous Metered Addition of the Urethane Alcohol Starter Compound"):

On completion of activation, propylene oxide (196 g) at 1.00 g/min and 18 g of the urethane alcohol from example 3 at 0.100 g/min were metered simultaneously into the reactor. At the same time, the reaction temperature was lowered from 130° C. at 1° C./min to 105° C. The progress of the reaction was monitored via the $CO_2$ consumption, by keeping the pressure in the reactor constant at 50 bar of $CO_2$ by continuously regulated replenishment. After the addition of PO had ended, stirring was continued at 105° C. and reaction pressure until the $CO_2$ consumption had abated (1200 rpm). This further reaction took about 3 h.

The product mixture obtained was freed of traces of monomeric propylene oxide by means of a rotary evaporator and stabilized by the addition of 500 ppm of Irganox 1076. Subsequently, the cyclic propylene carbonate was removed from the reaction mixture by means of thin-film evaporation (0.1 mbar, 120° C.). The $CO_2$ content incorporated in the polyether carbonate polyol, the viscosity, and OH number were determined by the abovementioned analytical methods.

Properties of the resulting polyether carbonate polyol:
OH number: 58.7 mg KOH/g,
Viscosity (25° C.): 4640 mPas
$CO_2$ content: 15.0%

Example 7: Continuous Process with Continued Metered Addition of the Urethane Alcohol Starter Compound The reaction was conducted in a continuously operated stirred tank cascade consisting of five pressure vessels connected in series (reactor R1, reactor R2, reactor R3, reactor R4 and reactor R5).

R1, R2, R3, R4 and R5 are each reactors continuously stirred reactors:

Reactor R1 (capacity 300 mL) had a height (internal) of 10.16 cm and an internal diameter of 6.35 cm. The reactor was equipped with an electrical heating jacket (maximum heating power 510 watts). The reactor had countercooling in the form of a U-shaped immersed tube of external diameter 3.17 mm, which projected into the reactor to 5 mm above the base, and through which cooling water flowed at about 10° C. The water flow was switched on and off by means of a magnetic valve. In addition, the reactor was equipped with an inlet tube for inert gas (nitrogen), an inlet tube for propylene oxide, and a temperature sensor of diameter 3.17 mm, which projected into the reactor to 3 mm above the base. In addition, the reactor was equipped with an inlet tube for inert gas or carbon dioxide and a connection for vacuum, which led into the gas phase of the reactor. The reactor was stirred by means of a pitched blade stirrer, which had four stirrer paddles (45°) each having a diameter of 35 mm and a height of 10 mm. By means of a mass flow regulator, the liquid phase was metered into reactor R2.

Reactor R2 (capacity 300 mL) had a height (internal) of 10.16 cm and an internal diameter of 6.35 cm. The reactor was equipped with an electrical heating jacket (maximum heating power 510 watts). The reactor had countercooling in the form of a spiral-wound tube of external diameter 3.17 mm, through which cooling water flowed at about 10° C. The water flow was switched on and off by means of a magnetic valve. In addition, the reactor was equipped with an inlet tube for inert gas (nitrogen), an inlet tube for propylene oxide, and a temperature sensor of diameter 3.17 min, which projected into the reactor. In addition, the reactor was equipped with an inlet tube for inert gas or carbon dioxide and a connection for vacuum, which led into the gas phase of the reactor. The reactor was stirred by means of a pitched blade stirrer, which was in the middle of a flow direction plate having baffles. The pitched blade stirrer was a stirrer having four stirrer paddles (45°) having a diameter of 35 mm and a height of 10 mm. In addition, the reactor had a sightglass. Via a heated tube, the overflow was conducted into reactor R3.

Reactor R3 (capacity 300 mL) had a height (internal) of 10.16 cm and an internal diameter of 6.35 cm. The reactor was equipped with an electrical heating jacket (maximum heating power 510 watts). The reactor had countercooling in the form of a spiral-wound tube of external diameter 3.17 mm, through which cooling water flowed at about 10° C. The water flow was switched on and off by means of a magnetic valve. In addition, the reactor was equipped with an inlet tube for the reaction mixture from reactor R2 and a temperature sensor of diameter 3.17 mm. Via a heated tube, the overflow was conducted into reactor R4. Reactor R4 was of identical design to reactor R3. The overflow was conducted via a heated tube into reactor R5.

Reactor R5 (capacity 1700 mL) had a height (internal) of 28.5 cm and an internal diameter of 9.82 cm. The reactor was equipped with an electrical heating jacket (maximum heating power 510 watts). The reactor had countercooling in the form of an immersed tube bent in the form of a wave and having external diameter 6.35 min, which projected into the reactor to 5 mm above the base and through which cooling water flowed at about 10° C. The water flow was switched on and off by means of a magnetic valve. In addition, the reactor was equipped with a temperature sensor of diameter 3.17 mm, which projected into the reactor to 3 mm above the base. The reactor was stirred by means of a spiral stirrer where a rectangular metal rod in spiral form having a cross section of 12.4×45 mm was mounted on the stirrer shaft, with an external spiral diameter of 6 cm, an internal diameter of 4.6 cm and a height of 14 cm. The gas phase was discharged into the waste air via a pressure-retaining valve, For the recording of the propylene oxide concentration during the catalyst activation in reactor R2, a Bruker MATRIX-MF spectrometer equipped with 3.17 mm ATR-IR fiber optic probes was used. The ATR-IR fiber optic probes (90° diamond prism with base area 1×2 mm and height 1 mm as ATR element, 2×45° reflection of the IR beam. IR beam introduced via optical fibers) was installed into the reactors in such a way that the diamond at the end of the 3.17 mm ATR fiber optic probe was completely immersed into the reaction mixture. IR spectra (mean of 100 scans) were recorded every 60 seconds in the range of 4000-650 $cm^{-1}$ with a resolution of 4 $cm^{-1}$. The propylene oxide concentration was monitored via recording of the characteristic bands for propylene oxide at 830 $cm^{-1}$. A decrease in the intensity of the bands at 830 $cm^{-1}$ to 5% of the maximum value was regarded as complete conversion of propylene oxide.

For the removal of the volatile constituents, the reaction mixture was guided through a falling-film evaporator. The solution (0.1 kg in 1 h) ran along the inner wall of a tube of diameter 70 mm and length 200 mm which was heated externally to 120° C., in the course of which the reaction mixture was distributed homogeneously as a thin film on the inner wall of each falling-film evaporator by three rollers of diameter 10 mm rotating at a speed of 250 rpm. Within the tube, a pressure of <1 mbar was established by means of a pump. The reaction mixture which had been purified to free it of volatile constituents (e.g. unconverted propylene oxide, cyclic propylene carbonate) was collected in a receiver at the lower end of the heated tube.

Process Steps:
Preparation of a Mixture of DMC Catalyst and Urethane Alcohol Starter Compound:

A 300 mL pressure reactor (reactor R1) equipped with a pitched blade stirrer was initially charged with a mixture of DMC catalyst (0.645 g) and urethane alcohol from Example 1a (250.00 g). The reactor was closed and the mixture of DMC catalyst and starter was stirred in reactor R1 at 40° C. at 300 rpm and 1 bar overnight. The pressure in reactor R1 was regulated stepwise to 47 bar with nitrogen which was introduced into the gas phase.

Step (β) (Activation):

A 300 mL pressure reactor (reactor R2) equipped with pitched blade stirrer, baffles and flow direction plate was initially charged with a mixture of DMC catalyst (0.059 g) and propylene carbonate (150.10 g) and stirred at 650 rpm. Subsequently, at the base of the reactor, a gentle nitrogen flow of 10 g/h into the reaction mixture was established with the waste air tap open. The reaction mixture was inertized for 31 min and the reactor was then closed. The reactor was heated up to 130° C. 15 g of propylene oxide were metered in with the aid of a mass flow regulator (200 g/h). The decrease in the concentration of propylene oxide was monitored via IR spectroscopy. The reaction mixture was stirred (650 rpm) until the conversion of the propylene oxide was complete (about 15 min). Subsequently, twice more, 15 g of propylene oxide were metered in with the aid of a mass flow regulator (200 g/h) and the reaction mixture was stirred (650 rpm) each time until the conversion of the propylene oxide was complete (about 15 min). The occurrence of a brief increase in evolution of heat in the reactor after addition of the propylene oxide confirmed that the catalyst had been activated. Subsequently, by means of a mass flow meter and a micro-annular gear pump, the mixture of urethane alcohol and DMC catalyst was metered in from reactor R1 (20 g/h). The flow was regulated to 7.70 g/h as soon as the exit of the mixture of urethane alcohol and DMC catalyst was visible through the sightglass at the end of the immersed conduit (about 8 min). In addition, 71 g/h of propylene oxide were metered continuously into reactor R2 via a mass flow regulator and an immersed conduit.

Step (γ) (Copolymerization):

As soon as the overflow from reactor R2 (at liquid volume 195 mL) had been reached, the valve at the outlet of reactor R2 was opened. $CO_2$ was introduced continuously into the gas phase of reactor R2 at a flow rate of 23 g/h. The outlet stream was led through the further pressure vessels (reactors R3, R4 and R5) and a pressure-retaining valve which had been set to supply pressure 50 bar. The temperature in reactors R3 and R4 was regulated to 130° C., and that in reactor R5 to 100° C. The stirrer speed in reactors R3 and R4 was 650 rpm, and that in reactor R5 200 rpm. The product mixture was collected at 100° C. under pressure in reactor R5 and stirred at 200 rpm. The temperature of the heated conduits between reactors R1 and R2 was 50° C., and that of those between reactors R2-R3 and R3-R4 and R4-R5 was 100° C. After an operating time of 94 hours, a sample of the liquid phase was taken from reactor R5 via a valve. After the volatile constituents had been removed from the reaction mixture by means of the falling-film evaporator (see above), the polyether carbonate polyol was obtained:

Properties of the Resulting Polyether Carbonate Polyol:
OH number: 66.3 mg KOH/g
Viscosity (25° C.): 1855 mPas
$CO_2$ content: 10.2%

Examples 8-11: Production of Flexible Polyurethane Foams

Flexible polyurethane foams were produced according to the recipes specified in table 1 below. The proportions of the components are listed in parts by weight.

High-quality flexible polyurethane foams having homogeneous cell structure were obtained, which were characterized by determining the apparent densities and compression hardnesses (compression hardness measured at 40% compression) (table 1).

TABLE 1

| Preparation of flexible polyurethane foams | | | | |
|---|---|---|---|---|
| Example | 8 | 9 | 10 | 11 |
| Polyether carbonate polyol from example 4 [parts by wt.] | 100 | 100 | — | — |
| Polyether carbonate polyol from example 5 [parts by wt.] | — | — | 100 | — |
| Polyether carbonate polyol from example 6 [parts by wt.] | — | — | — | 100 |
| Stabilizer 1 [parts by wt.] | 2.4 | 1.2 | 2.4 | 2.4 |
| Catalyst 1 [parts by wt.] | 0.15 | 0.12 | 0.15 | 0.15 |
| Catalyst 2 [parts by wt.] | 0.14 | 0.18 | 0.14 | 0.14 |
| Water [parts by wt.] | 2.50 | 4.50 | 2.50 | 2.50 |
| Isocyanate 1 [parts by wt.] | 36.0 | 56.8 | 34.5 | 34.2 |
| NCO index | 108 | 108 | 108 | 108 |
| Apparent density [kg/m³] | 39.3 | 27.8 | 41.4 | 37.2 |
| Compression hardness, 4th cycle [kPa] | 3.0 | 4.4 | 3.4 | 0 |

The invention claimed is:

1. A process for preparing polyether carbonate polyols, the process comprising an addition of alkylene oxides and carbon dioxide onto H-functional starter compounds comprising at least one urethane alcohol of formula (II)

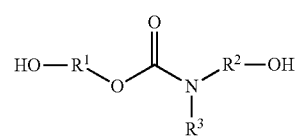

(II)

where
R¹ is linear or branched $C_2$- to $C_{24}$-alkylene which may optionally be interrupted by heteroatoms such as O, S or N and may be substituted,
R² is linear or branched $C_2$- to $C_{24}$-alkylene which may optionally be interrupted by heteroatoms such as O, S or N and may be substituted,
R³ is H, linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms such as O, S or N and/or each of which may be substituted by alkyl, aryl and/or hydroxyl.

2. The process as claimed in claim 1, wherein
$R^1 = CH_2-CH_2$ or $CH_2-CH(CH_3)$,
$R^2 = CH_2-CH_2$ or $CH_2-CH(CH_3)$, and
$R^3 = H$.

3. The process as claimed in claim 1, wherein the urethane alcohol of formula (II) is obtained by reacting propylene carbonate and/or ethylene carbonate with an alkanolamine of formula (III)

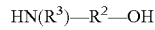

(III)

4. The process as claimed in claim 3, wherein the urethane alcohol is obtained by reacting propylene carbonate and/or ethylene carbonate with at least one amine selected from the group consisting of ethanolamine, diethanolamine, (N-methyl)ethanolamine, isopropanolamine, diisopropanolamine and propanolamine.

5. The process as claimed in claim 1, wherein the alkylene oxide used is at least one alkylene oxide selected from the group consisting of ethylene oxide and propylene oxide.

6. The process as claimed in claim 1, wherein the addition is conducted in the presence of at least one DMC catalyst.

7. The process as claimed in claim 1, wherein the addition is conducted in the presence of a metal complex catalyst based on the metals zinc and/or cobalt.

8. The process as claimed in claim 1, wherein
(α) the urethane alcohol of formula (II) or a suspension medium is initially charged and any water and/or other volatile compounds are removed by elevated temperature and/or reduced pressure, with addition of the DMC catalyst to the urethane alcohol of formula (II) or to the suspension medium before or after the removal of the water and/or the other volatile compounds, and
(β) adding a portion to activate copolymerization (based on the total amount of alkylene oxides used in the activation and copolymerization) of alkylene oxide to the mixture resulting from step (α), where this portion of alkylene oxide may optionally be added in the presence of $CO_2$ and where a temperature spike that occurs due to the exothermic chemical reaction that follows and/or a pressure drop in the reactor is awaited in each case, and where step (β) for activation may also be repeated, and
(γ) adding alkylene oxide, carbon dioxide and optionally urethane alcohol of formula (II) to the mixture resulting from step (β),
where at least one urethane alcohol of formula (II) is added as H-functional starter substance at least in one of steps (α) and (γ).

9. The process as claimed in claim 1, wherein one or more urethane alcohols of the formula (II) are metered continuously into a reactor as H-functional starter substance(s) during the addition.

10. The process as claimed in claim 6, wherein the one or more urethane alcohols of formula (II), the one or more alkylene oxide(s) and the DMC catalyst are metered continuously into a reactor in the presence of the carbon dioxide and wherein the resulting reaction mixture, which includes the reaction product of the copolymerization, is removed continuously from the reactor.

11. The process as claimed in claim 10, wherein, in a step (δ), the reaction mixture removed continuously from the reactor with a content of 0.05% by weight to 10% by weight of alkylene oxide is transferred into a postreactor in which, by way of a postreaction, the content of free alkylene oxide is reduced to less than 0.05% by weight in the reaction mixture.

12. A polyurethane foam prepared by reacting a polyisocyanate with a polyether carbonate polyol containing a structural unit of the formula (IV)

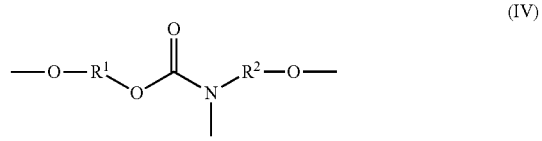

where
$R^1 = CH_2-CH_2$ or $CH_2-CH(CH_3)$,
$R^2 = CH_2-CH_2$ or $CH_2-CH(CH_3)$,
and where $R^1$ and $R^2$ may be identical or different from one another.

* * * * *